United States Patent Office 3,377,342
Patented Apr. 9, 1968

3,377,342
2′,2′ - BISTRIFLUOROMETHYLOXETANO(3′,4′; 16α,17α) DERIVATIVES OF 4 - PREGNENO [3,2-c]PYRAZOLES AND 4,6-PREGNADIENO [3,2-c]PYRAZOLES
John H. Fried, Palo Alto, Calif., assignor to Syntex Corporation, Panama, Panama, a corporation of Panama
No Drawing. Filed May 2, 1966, Ser. No. 546,517
13 Claims. (Cl. 260—239.55)

This invention relates to novel cyclopentanophenanthrene derivatives and to a process for the production thereof. More specifically, this invention relates to novel 2′,2′-bistrifluoromethyloxetano(3′,4′; 16α,17α) derivatives of 4-pregneno[3,2-c] pyrazoles and 4,6-pregnadieno [3,2-c] pyrazoles.

The compounds of this invention may be represented by the following formula:

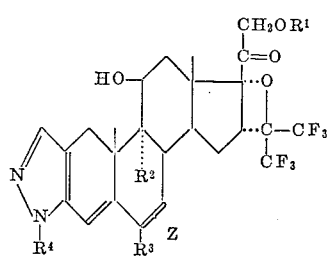

wherein Z is a carbon-carbon single bond or a carbon-carbon double bond;
$R^1$ is hydrogen, phosphono, tetrahydropyran-2-yl, tetrahydrofuran-2-yl or a hydrocarbon carboxylic acyl group containing less than 12 carbon atoms;
$R^2$ is hydrogen or fluoro;
$R^3$ is hydrogen or methyl;
$R_4$ is hydrogen, phenyl, fluorophenyl, nitrophenyl or methoxyphenyl.

The hydrocarbon carboxylic acyl and acyloxy groups of the present invention will contain less than 12 carbon atoms and may be of a straight, branched, cyclic or cyclic-aliphatic chain structure. This structure may be saturated, unsaturated, or aromatic and optionally substituted by functional groups such as hydroxy, acyloxy containing up to 12 carbon atoms, nitro, amino, halogeno, and the like. Typical esters thus include acetate, propionate, enanthate, benzoate, trimethylacetate, t-butylacetate, phenoxyacetate, cyclopentylpropionate, aminoacetate, β-chloropropionate, adamantoate, and the like.

The phosphono group includes the mono or disodium or potassium salts thereof.

The novel compounds of the present invention are cortical hormones with high anti-inflammatory and low catabolic activities and are useful in the treatment of rheumatoid arthritis, contact dermatitis, allergies and the like. The compounds of the present invention may be administered via usual routes in the standard pharmaceutical compositions and at dosages appropriate for the particular conditions being treated.

The compounds are prepared according to the following reaction sequence:

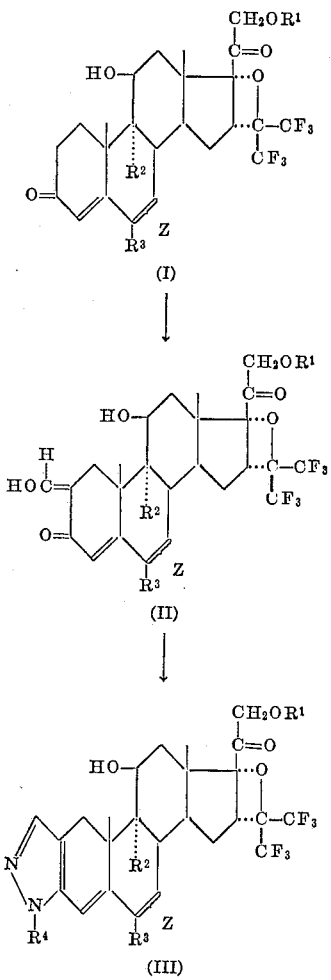

wherein all substituents are as previously defined.

The preparation of the starting materials represented by Formula I is described in copending application Ser. No. 546,549 filed May 2, 1966. Briefly, they are prepared by the photochemical addition of hexafluoroacetone to a 3,20-diketo-Δ4,16-diene of the pregnane series. Prior to the photochemical addition, a 3-keto-Δ4-ene group is protected by formation of an ethylene ketal as for example, by treatment with 2-methyl-2-ethyl-1,3-dioxolane and p-toluenesulfonic acid to form a corresponding 3,3-ethylenedioxy group. The photochemical addition is then performed by irradiation of hexafluoroacetone and the Δ4,16-diene under U.V. light of a wave length of about 270 to about 330 mu. Subsequent to the addition, a 3-keto group is regenerated by conventional acidic hydrolysis of the ethylene ketal to yield those starting materials represented by Formula I.

In the practice of the process, a 21-hydroxy group is protected during the reaction sequence of the present invention by formation of a corresponding 21-(tetrahydropyran-2-yl) or 21-(tetrahydrofuran-2-yl) group. Thus, treatment of the 3-keto-Δ⁴-ene or 3-keto-Δ⁴,⁶-diene of Formula I with ethyl formate and sodium hydride in an inert atmosphere affords a corresponding 2-hydroxymethylene intermediate represented by Formula II. This intermediate is then condensed with a molar equivalent of hydrazine hydrate or a substituted hydrazine hydrochloride and sodium acetate in an aqueous methanolic solution at 0° C. for about 24 hours to effect ring closure and afford a corresponding 4-pregneno[3,2-c] pyrazole or 4,6-pregnadieno[3,2-c] pyrazole represented by Formula III. Among the substituted hydrazines of the present invention, are phenylhydrazine, fluorohydrazine, nitrophenylhydrazine, and methoxyphenylhydrazine. The p-substituted phenylhydrazines are preferred.

Subsequent to the formation of the pyrazole ring, the 21-(tetrahydropyran-2-yl) or 21-(tetrahydrofuran-2-yl) group may be removed by acid hydrolysis to afford the 21-hydroxy compounds of the present invention. The latter compounds may be esterified via conventional techniques to afford those 21-acyloxy compounds of the present invention.

The following examples will illustrate the present invention but are not intended to limit the scope thereof.

Example 1

To a stirred solution of 3 g. of 2',2'-bistrifluoromethyloxetano(3',4'; 16α,17α) - 11β - hydroxy - 21 - (tetrahydropyran-2-yloxy)-pregn-4-ene-3,20-dione in 60 ml. of anhydrous benzene is added, with cooling and under nitrogen, a suspension of 3 ml. of ethyl formate and 1.3 g. of sodium hydride in mineral oil. The mixture is stirred at room temperature for 24 hours and hexane is then added until complete precipitation occurs. The solid which forms is collected, dried under vacuum and suspended in aqueous hydrochloric acid. This suspension is stirred at room temperature for half an hour and then filtered. The solid thus collected is washed with water and dried to yield 2-hydroxymethylene-2',2'-bistrifluoromethyloxetano-(3',4'; 16α,17α) - 11β - hydroxy - 21 - (tetrahydropyran-2-yloxy)-pregn-4-ene-3,20-dione which is recrystallized from methylene chloride:hexane.

A mixture of the 2-hydroxymethylene intermediate, 2 g. of sodium acetate, 100 ml. of aqueous methanol and 1 ml. of phenylhydrazine hydrochloride is allowed to stand under nitrogen at 0° C. for 24 hours. Acetic acid (2 ml.) is added and the mixture is allowed to stand for another 4 hours. The reaction mixture is diluted with ethyl acetate and washed with 2 N sodium hydroxide and water. The ethyl acetate extracts are dried, concentrated and chromatographed over silica, eluting with benzene, to afford 2',2'-bistrifluoromethyloxetano(3',4'; 16α,17α)-11β - hydroxy-21-(tetrahydropyran - 2 - yloxy)-20-keto-2''-phenyl-4-pregneno[3,2-c] pyrazole.

To a solution of 1 g. of the latter material in 30 ml. of acetic acid is added 0.5 ml. of 2 N hydrochloric acid. The mixture is allowed to stand for 5 hours at room temperature and then diluted with ice water and extracted with methylene chloride. The extracts are washed with water to neutrality, dried over sodium sulfate and evaporated to dryness to yield 2',2'-bistrifluoromethyloxetano-(3',4'; 16α,17α) - 11β,21 - dihydroxy-20-keto-2''-phenyl-4-pregneno[3,2-c] pyrazole which is recystallized from acetone:hexane.

Utilizing the above procedure, the following starting materials, namely:

2',2' - bistrifluoromethyloxetano(3',4'; 16α,17α)-9α-fluoro-11β-hydroxy - 21 - (tetrahydrofuran-2-yloxy)-pregn-4-ene-3,20-dione;

2',2' - bistrifluoromethyloxetano(3',4'; 16α,17α)-6α-methyl - 11β - hydroxy-21-(tetrahydropyran-2-yloxy)-pregn-4-ene-3,20-dione;

2',2' - bistrifluoromethyloxetano(3'4'; 16α,17α)-9α-fluoro-11β-hydroxy-21-(tetrahydropyran - 2 - yloxy)-pregna-4,6-diene-3,20-dione;

2',2'-bistrifluoromethyloxetano(3',4'; 16α,17α) - 6 - methyl-9α-fluoro-11β - hydroxy - 21 - (tetrahydropyran-2-yloxy)-pregna-4,6-diene-3,20-dione;

2',2' - bistrifluoromethyloxetano(3',4'; 16α,17α)-6α-methyl - 9α - fluoro - 11β - hydroxy-21-(tetrahydrofuran-2-yloxy)-pregn-4-ene-3,20-dione;

2',2'-bistrifluoromethyloxetano(3',4'; 16α,17α) - 6 - methyl-11β-hydroxy-21-(tetrahydropyran-2-yloxy) - pregna-4,6-diene-3,20-dione;

2',2' - bistrifluoromethyloxetano(3',4'; 16α,17α)-9α-fluoro-11β-hydroxy-21-(tetrahydrofuran - 2 - yloxy)-pregna-4,6-diene-3,20-dione;

2',2'-bistrifluoromethyloxetano(3',4'; 16α,17α) - 11β - hydroxy - 21 - (tetrahydropyran - 2 - yloxy)-pregna-4,6-diene-3,20-dione;

2'2'-bistrifluoromethyloxetano(3',4'; 16α,17α)-9α-fluoro-11β-hydroxy-21-(tetrahydropyran-2-yloxy)-pregna-4,6-diene-3,20-dione; and 2',2'-bistrifluoromethyloxetano(3',4'; 16α,17α)-6-methyl-9α-fluoro-11β-hydroxy-21-(tetrahydrofuran-2-yloxy)-pregna-4,6-diene-3,20-dione;

are converted to the corresponding 2''-phenyl- 4-pregneno[3,2-c]pyrazoles and 2''-phenyl-4,6-pregnadieno[3,2-c]pyrazole; namely:

2'2'-bistrifluoromethyloxetano(3',4'; 16α,17α)-9α-fluoro-11β,21-dihydroxy-20-keto-2''-phenyl-4-pregneno[3,2-c]pyrazole;

2',2'-bistrifluoromethyloxetano(3',4'; 16α,17α)-6α-methyl-11β,21-dihydroxy-20-keto-2''-phenyl-4-pregneno[3,2-c]pyrazole;

2'2'-bistrifluoromethyloxetano(3',4'; 16α,17α)-9α-fluoro-11β,21-dihydroxy-20-keto-2''-phenyl 4,6-pregnadieno[3,2-c]pyrazole;

2',2'-bistrifluoromethyloxetano(3',4'; 16α,17α)-6-methyl-9α-fluoro-11β,21-dihydroxy-20-keto-2''-phenyl-4,6-pregnadieno[3,2-c]pyrazole;

2',2'-bistrifluoromethyloxetano(3',4'; 16α,17α)-6α-methyl-9α-fluoro-11β,21-dihydroxy-20-keto-2''-phenyl-4-pregneno[3,2-c]pyrazole;

2',2'-bistrifluoromethyloxetano(3',4'; 16α,17α)-6-methyl-11β,21-dihydroxy-20-keto-2''phenyl-4,6-pregnadieno[3,2-c]pyrazole;

2',2'-bistrifluoromethyloxetano(3',4'; 16α,17α)-9α-fluoro-11β,21-dihydroxy-20-keto-2''-phenyl-4,6-pregnadieno[3,2-c]pyrazole;

2',2'-bistrifluoromethyloxetano(3',4'; 16α,17α)11β,21-dihydroxy-20-keto-2''-phenyl-4,6-pregnadieno[3,2-c]pyrazole;

2'2'-bistrifluoromethyloxetano(3',4'; 16α,17α)-9α-fluoro-11β,21-dihydroxy-20-keto-2''-phenyl-4,6-pregnadieno[3,2-c]pyrazole; and 2',2'-bistrifluoromethyloxetano(3',4'; 16α,17α)-6-methyl-9α-fluoro-11β,21-dihydroxy-20-keto-2''-phenyl-4,6-pregnadieno[3,2-c]pyrazole; respectively.

Utilizing the same procedure and starting materials with one exception, namely, substituting an equivalent amount of p-fluorophenylhydrazine hydrochloride in place of the phenylhydrazine hydrochloride, there are obtained the corresponding 2''-(p-fluorophenyl)-4-pregneno[3,2-c] pyrazoles and 2''-(p-fluorophenyl)-4,6-pregnadieno[3,2-c] pyrazoles.

Again utilizing the same procedure and starting materials with one exception, namely substituting an equivalent amount of hydrazine hydrate in place of the phenylhydrazine hydrochloride, there are obtained the corresponding 4-pregneno[3,2-c]pyrazoles and 4,6-pregnadieno[3,2-c]pyrazoles.

In a similar fashion, the use of p-nitrophenylhydrazine hydrochloride and p-methoxyphenylhydrazine hydrochloride in place of phenylhydrazine hydrochloride yields the corresponding 2''-(p-nitrophenyl)-4-pregneno[3,2-c] pyrazoles, the 2''-(p-nitrophenyl)-4,6-pregnadieno[3,2-c] pyrazoles, the 2''-(p-methoxyphenyl)-4-pregneno[3,2-c] pyrazoles and the 2''-p-methoxyphenyl)-4,6-pregnadieno [3,2-c]pyrazoles.

Example 2

A mixture of 1 g. of 2',2'-bistrifluoromethyloxetano (3',4'; 16α,17α)-6α-methyl-11β,21-dihydroxy-20-keto-2''-phenyl-4-pregneno[3,2-c]pyrazole, 4 ml. of pyradine and 2 ml. of acetic anhydride is allowed to stand at room temperature for 15 hours. The mixture is then poured into ice water and the solid which forms is collected by filtration, washed with water and dried to yield 2',2'-bistrifluoromethyloxetano(3',4'; 16α,17α) - 6α-methyl-11β-hydroxy - 21 - acetoxy-20-keto-2''-phenyl-4-pregneno[3,2-c] pyrazole which may be further purified through recrystallization from acetone:hexane.

In a similar fashion, by utilizing the same procedure, the 21-hydroxy compounds prepared in Example 1 are converted to their 21-acetates. Notably among these are the following:

2',2'-bistrifluoromethyloxetano(3',4'; 16α,17α)-9α-fluoro-11β-hydroxy-21-acetoxy-20-keto-2''-(p-fluorophenyl)-4-pregneno[3,2-c]pyrazole;
2',2'-bistrifluoromethyloxetano(3',4'; 16α,17α)-6-methyl-11β-hydroxy-21-acetoxy-20-keto-2''-(p-fluorophenyl)·4,6-pregnadieno[3,2-c]pyrazole;
2',2'-bistrifluoromethyloxetano(3',4'; 16α,17α)-6α-methyl-11β-hydroxy-21-acetoxy-20-keto-2''-phenyl-4-pregneno[3,2-c]pyrazole;
2'2'-bistrifluoromethyloxetano(3',4'; 16α,17α)-9α-fluoro-11β-hydroxy-21-acetoxy-20-keto-2''-(p-nitrophenyl)-4,6-pregnadieno[3,2-c]pyrazole; and
2',2'-bistrifluoromethyloxetano(3',4'; 16α, 17α)-11β-hydroxy-21-acetoxy-20-keto-2''-(p-methoxyphenyl)-4-pregneno[3,2-c]pyrazole.

In a similar fashion, by utilizing anhydrides of other hydrocarbon carboxylic acids of less than 12 carbon atoms in place of acetic anhydride, there are obtained the corresponding 21-acyloxy compounds.

Example 3

A mixture of 2 g. of 2',2'-bistrifluoromethyloxetano (3',4'; 16α,17α) - 9α-fluoro-11β,21-dihydroxy-20-keto-2''-(p-fluorophenyl)-4-pregneno[3,2-c]pyrazole in 8 ml. of pyridine and 4 ml. of trimethylacetyl chloride is heated at steam bath temperatures for one hour. The mixture is then poured into ice water. The solid which forms is collected by filtration, washed with water and dried to yield 2',2'-bistrifluoromethyloxetano(3',4'; 16α,17α)-9α-fluoro - 11β - hydroxy-21-trimethylacetoxy-20-keto-2''-(p-fluorophenyl)-4-pregneno[3,2-c]pyrazole which may be recrystallized from methylene chloride:hexane.

In a similar fashion by utilizing the same procedure, the 21-hydroxy compounds listed as final products in Example 1, are converted to their 21-trimethylacetates.

Example 4

To a cooled solution (0° C.) of 3.4 g. of 2',2'-bistrifluoromethyloxetano(3',4'; 16α,17α) - 11β,21 - dihydroxy-20-keto-2''-phenyl-4-pregneno[3,2-c]pyrazole in 20 ml. of 9:1 chloroform:pyridine is added in small portions 1.4 g. of methanesulfonyl chloride. The reaction mixture is allowed to stand for 14 hours at 0° C. and is then washed with dilute hydrochloric acid, water and sodium bicarbonate solution. The chloroform is removed by evaporation under reduced pressure and the residue is dissolved in 20 ml. of acetone treated at room temperature and under stirring with 4 g. of sodium iodide. Sodium thiosulfate solution is added, followed by water. The solid is collected and dried to yield 2',2'-bistrifluoromethyloxetano(3,4'; 16α,17α)-11β-hydroxy-21-iodo - 20 - keto - 2'' - phenyl-4-pregneno[3,2-c] pyrazole. A mixture of 1 g. of the above 21-iodo intermediate and 1.1 molar equivalents of silver monobasic phosphate in 60 ml. of acetonitrile is heated at reflux for 2 hours. The mixture is then filtered and evaporated to dryness to yield 2',2'-bistrifluoromethyl-oxetano - (3',4'; 16α,17α)-11β-hydroxy-21-phosphato-20-keto-2''-phenyl-4-pregneno[3,2-c] pyrazole which may be crystallized from methanol ethyl acetate.

The above 21-phosphate is dissolved in methanol and triturated with aqueous sodium hydroxide to yield the corresponding monosodium and disodium salts. In a similar fashion, aqueous potassium hydroxide affords the monopotassium and dipotassium salts.

Utilizing the same procedure, other 21-hydroxy compounds of the present invention are converted to the corresponding 21-iodo intermediate and then to the corresponding 21-phosphate compounds.

What is claimed is:
1. A compound according to the formula:

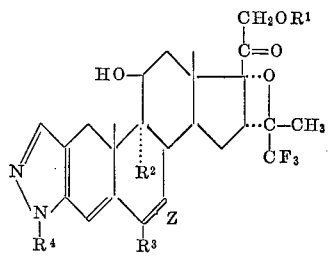

wherein Z is a carbon-carbon single bond or a carbon-carbon double bond;
$R^1$ is hydrogen, phosphono, tetrahydropyran-2-yl, tetrahydrofuran-2-yl or a hydrocarbon carboxylic acyl group containing less than 12 carbon atoms;
$R^2$ is hydrogen or fluoro;
$R^3$ is hydrogen, or methyl;
$R^4$ is hydrogen, phenyl, fluorophenyl, nitrophenyl or methoxyphenyl.

2. A compound according to claim 1 wherein $R^1$ is hydrogen or acetyl; $R^3$ is α-methyl or hydrogen; Z is a carbon-carbon single bond; $R^4$ is hydrogen.

3. A compound according to claim 2 wherein $R^1$ is hydrogen or acetyl; $R^3$ is α-methyl or hydrogen; Z is a carbon-carbon single bond; $R^4$ is phenyl.

4. A compound according to claim 1 wherein $R^1$ is hydrogen or acetyl; $R^3$ is α-methyl or hydrogen; Z is a carbon-carbon single bond; and $R^4$ is p-fluorophenyl.

5. A compound according to claim 1 wherein $R^1$ is hydrogen or acetyl; $R^3$ is methyl; Z is a carbon-carbon double bond; and $R^4$ is hydrogen.

6. A compound according to claim 1 wherein $R^1$ is hydrogen or acetyl; $R^3$ is methyl; Z is a carbon-carbon double bond; $R^4$ is phenyl.

7. A compound according to claim 1 wherein $R^1$ is hydrogen or acetyl; $R^3$ is methyl; Z is a carbon-carbon double bond; $R^4$ is p-fluorophenyl.

8. A compound according to claim 1 wherein $R^1$ is hydrogen or acetyl; $R^2$ is fluoro; $R^3$ is hydrogen or α-methyl; Z is a carbon-carbon single bond; $R^4$ is hydrogen.

9. A compound according to claim 1 wherein $R^1$ is hydrogen or acetyl; $R^2$ is fluoro; $R^3$ is hydrogen or α-methyl; Z is a carbon-carbon single bond; $R^4$ is phenyl.

10. A compound according to claim 1 wherein $R^1$ is hydrogen or acetyl; $R^2$ is fluoro; $R^3$ is hydrogen or α-methyl; Z is a carbon-carbon single bond; $R^4$ is p-fluorophenyl.

11. A compound according to claim 1 wherein $R^1$ is hydrogen or acetyl; $R^2$ is fluoro; $R^3$ is methyl; Z is a carbon-carbon double bond; $R^4$ is hydrogen.

12. A compound according to claim 1 wherein $R^1$ is hydrogen or acetyl; $R^2$ is fluoro; $R^3$ is methyl; Z is a carbon-carbon double bond; $R^4$ is phenyl.

13. A compound according to claim 1 wherein $R^1$ is hydrogen or acetyl; $R^2$ is fluoro; $R^3$ is methyl; Z is a carbon-carbon double bond; $R^4$ is p-fluorophenyl.

References Cited

UNITED STATES PATENTS 3,299,054   1/1967   Tishler et al. _____ 260—239.5

OTHER REFERENCES

Pike, J. E., Journal of Organic Chemistry, vol. 29, 1964, pp. 3476–3481.

LEWIS GOTTS, *Primary Examiner.*

E. G. LOVE, *Assistant Examiner.*

UNITED STATES PATENT OFFICE
CERTIFICATE OF CORRECTION

Patent No. 3,377,342            April 9, 1968

John H. Fried

It is certified that error appears in the above identified patent and that said Letters Patent are hereby corrected as shown below:

Column 6, lines 20 to 25, the right-hand portion of the formula should appear as shown below:

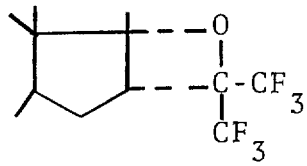

Signed and sealed this 16th day of September 1969.

(SEAL)
Attest:

Edward M. Fletcher, Jr.          WILLIAM E. SCHUYLER, JR.
Attesting Officer                     Commissioner of Patents